(12) United States Patent
Sjöberg et al.

(10) Patent No.: US 11,270,817 B2
(45) Date of Patent: Mar. 8, 2022

(54) BUSHING WITH A TAP ASSEMBLY

(71) Applicant: HITACHI ENERGY SWITZERLAND AG, Baden (CH)

(72) Inventors: Peter Sjöberg, Ludvika (SE); Björn Edberg, Borlänge (SE); Kenneth Johansson, Täby (SE); Jan-Åke Börjesson, Ludvika (SE)

(73) Assignee: HITACHI ENERGY SWITZERLAND AG, Baden (CH)

( * ) Notice: Subject to any disclaimer, the term of this patent is extended or adjusted under 35 U.S.C. 154(b) by 0 days.

(21) Appl. No.: 16/982,224

(22) PCT Filed: Mar. 22, 2019

(86) PCT No.: PCT/EP2019/057207
§ 371 (c)(1),
(2) Date: Sep. 18, 2020

(87) PCT Pub. No.: WO2019/180193
PCT Pub. Date: Sep. 26, 2019

(65) Prior Publication Data
US 2021/0027919 A1  Jan. 28, 2021

(30) Foreign Application Priority Data
Mar. 22, 2018 (EP) .................. 18163250

(51) Int. Cl.
*H01B 17/28* (2006.01)
*H01F 27/04* (2006.01)

(52) U.S. Cl.
CPC ............ *H01B 17/28* (2013.01); *H01F 27/04* (2013.01)

(58) Field of Classification Search
CPC ........ H01B 17/28; H01B 17/26; H01B 17/00; H01B 17/005; H01F 27/04; H01F 27/02;
(Continued)

(56) References Cited

U.S. PATENT DOCUMENTS

| 2,916,723 A | * | 12/1959 | Cronin | ................ H01B 17/28 174/152 R |
| 2,937,359 A | | 5/1960 | Cronin et al. | |

(Continued)

FOREIGN PATENT DOCUMENTS

CN  201903555 U  7/2011
CN  201975689 U  9/2011
(Continued)

OTHER PUBLICATIONS

International Search Report and Written Opinion of the International Searching Authority, PCT/EP2019/057207, dated Mar. 6, 2019, 12 pages.

(Continued)

*Primary Examiner* — Angel R Estrada
(74) *Attorney, Agent, or Firm* — Sage Patent Group

(57) ABSTRACT

A bushing including: a bushing comprising: a bushing body, an electrode contained in the bushing body, a flange body mounted to the bushing body, a tap assembly including: a hollow electrically conductive sleeve portion extending from the flange body, a conductor connected to the electrode and extending from the electrode into the sleeve portion, a pin connected to the conductor, an insulating body provided around the conductor in the sleeve portion, and an electrically conductive lid configured to be assembled with the sleeve portion, the lid having a cap portion and a hollow cylindrical extension portion, wherein the cap portion is configured to receive an end portion of the pin, wherein the extension portion extends axially from the cap portion and is configured to be received by the sleeve portion, and wherein the extension portion is configured to surround the insulating body in the sleeve portion when the lid is assembled with the sleeve portion.

10 Claims, 3 Drawing Sheets

(58) Field of Classification Search
CPC .. H02G 15/072; H02G 15/064; H01H 9/0264; H01H 9/0271; H01H 13/04; H01H 21/04; H01R 13/14
USPC .... 174/650, 140 R, 142, 144, 152 R, 11 BH, 174/14 BH, 31 R, 141 C; 16/2.1, 2.2
See application file for complete search history.

(56) References Cited

U.S. PATENT DOCUMENTS

| | | | | |
|---|---|---|---|---|
| 4,500,745 | A * | 2/1985 | Miggins | H01B 17/34 174/143 |
| 4,609,775 | A * | 9/1986 | Moran | H01B 17/34 174/152 R |
| 6,515,232 | B2 * | 2/2003 | Forster | H01B 17/26 174/142 |
| 8,704,097 | B2 * | 4/2014 | Xu | H01B 17/42 174/142 |
| 8,716,601 | B2 * | 5/2014 | Xu | H01B 17/42 174/142 |
| 8,759,683 | B2 * | 6/2014 | Ko | H01R 13/53 174/142 |
| 8,952,257 | B2 * | 2/2015 | Dais | H01F 27/04 174/142 |
| 2009/0288878 | A1 | 11/2009 | Rocks et al. | |
| 2010/0018753 | A1 | 1/2010 | Larsson et al. | |
| 2017/0287601 | A1 | 10/2017 | Engels et al. | |

FOREIGN PATENT DOCUMENTS

| | | |
|---|---|---|
| CN | 202736681 U | 2/2013 |
| CN | 204330914 U | 5/2015 |
| CN | 204991981 U | 1/2016 |
| CN | 105469934 A | 4/2016 |
| CN | 205140672 U | 4/2016 |
| CN | 105810390 A | 7/2016 |
| WO | WO 2015/180001 A1 | 12/2015 |

OTHER PUBLICATIONS

International Preliminary Report on Patentability, PCT/EP2019/057207, dated Apr. 24, 2020, 17 pages.
IEEE Standard for Performance Characteristics and Dimensions for Power Transformer and Reactor Bushings, IEEE Power and Energy Society, IEEE Std C57.19.01 2017, 13 pages.
"HSP Tap," Operating Instructions, HSP BAL ETFt/04e, Visum 11/15 T/str, p. 16.
Search Report, Chinese Patent Application No. 2019800166205, dated Aug. 15, 2021, 3 pages.

* cited by examiner

BUSHING WITH A TAP ASSEMBLY

CROSS REFERENCE TO RELATED APPLICATIONS

This application is a 35 U.S.C. § 371 national stage application of PCT International Application No. PCT/EP2019/057207 filed on Mar. 22, 2019, which in turns claims foreign priority to European Patent Application No. 18163250.6, filed on Mar. 22, 2018, the disclosures and content of which are incorporated by reference herein in their entirety.

TECHNICAL FIELD

The present disclosure generally relates to bushings.

BACKGROUND

A bushing may be used for leading a high voltage conductor through a medium which has a different electric potential than the high voltage conductor. The dimensions of high voltage electrical equipment at the interface between the high voltage conductor and the medium may thereby be kept smaller than would otherwise be possible.

In order to obtain a more evenly distributed electric field along the bushing body, the bushing may comprise a capacitive field grading arrangement, often referred to as a condenser core. This arrangement comprises a plurality of conductive layers electrically insulated from each other and extending longitudinally along the bushing body.

A bushing may also comprise bushing flanges, which when the bushing is installed normally are grounded. By means of the bushing flanges, the bushing may be mounted for example to a transformer tank or reactor tank.

Bushings may furthermore be provided with a tap to enable testing of the bushing. The current through the capacitance between the central conductor of the bushing and the outermost conductive layer, often referred to as "C1", of the condenser core or the current through the capacitance between the grounded bushing flange and the outermost conductive layer, often referred to as "C2", may for example be measured using the tap. For example, before the delivery of a bushing, the outermost conductive layer, which normally is grounded, may for the purpose of testing be provided with a voltage potential and the current through the capacitance C1 may be measured via the tap. Bushing characteristics such as capacitances may thus be verified before delivery. The tap may also be used as a voltage source supplying e.g. relays and control equipment with voltage.

The tap typically includes a conductor which is connected to the outermost conductive layer of the condenser core, and a lid which during normal operation is attached to the tap body. The lid is then at the same potential as the grounded bushing flanges.

Examples of bushing taps are disclosed in CN105469934 and WO2015180001.

SUMMARY

It has been found that very high currents may pass through the tap during transients and especially very fast transient situations. The current passes through the tap and flows to ground via the bushing flange. Impedance increases with frequency, i.e. during very fast transients, which leads to increased voltages. This can create flashover in the bushing, resulting in power outage and damaging of the bushing and other electrical equipment.

In view of the above, an object of the present disclosure is to provide a bushing which solves or at least mitigates existing problems of the state of the art.

There is hence provided a bushing comprising: a bushing body, an electrode contained in the bushing body, a flange body mounted to the bushing body, a tap assembly comprising: a hollow electrically conductive sleeve portion extending from the flange body, a conductor connected to the electrode and extending from the electrode into the sleeve portion, a pin connected to the conductor, an insulating body provided around the conductor in the sleeve portion, and an electrically conductive lid configured to be assembled with the sleeve portion, the lid having a cap portion and a hollow cylindrical extension portion, wherein the cap portion is configured to receive an end portion of the pin, wherein the extension portion extends axially from the cap portion and is configured to be received by the sleeve portion, and wherein the extension portion is configured to surround the insulating body in the sleeve portion when the lid is assembled with the sleeve portion.

At low frequencies resistance is the dominating parameter for the current flow path and thus the current in these situations flows along the shortest route. At high frequencies inductance will dominate and the current choses the route with the lowest inductance. The route with the lowest inductance is the one which is closest to the current flowing from the electrode via the conductor and the pin. Since the electrically conductive extension portion surrounding the insulating body in the sleeve portion fills the space between the insulating body and the flange body/sleeve portion, the return current will be as close as practically possible to the current flowing through the conductor and the pin, and the inductance during transients will thus be minimised, reducing the risk of flashover in the bushing.

The flange body is preferably grounded during normal operation of the bushing. The sleeve portion is in electrical contact with the flange body. The sleeve portion is hence also grounded during operation of the bushing.

The tap assembly may be dimensioned to be classified as a type A voltage tap according to IEEE C57.19.01.

According to one embodiment in the sleeve portion the insulating body is arranged at a radial distance from the inner surface of the sleeve portion, whereby a chamber is formed therebetween, wherein the extension portion is configured to extend inside the chamber from a lid end of the chamber and along at least half of the length of the chamber, such as along at least two thirds of the length of the chamber, such as along at least three fourths of the length of the chamber.

The lid end of the chamber is the open end of the chamber, which is configured to receive the cap portion of the lid.

According to one embodiment the extension portion has an external surface which follows the profile of the inner surface of the sleeve portion in the axial direction, and wherein the extension portion has an inner surface which follows the profile of the external surface of the insulating body in the axial direction.

According to one embodiment the extension portion fills a majority of the chamber.

According to one embodiment the external surface of the extension portion is arranged at a distance from the inner surface of the sleeve portion along the majority of the axial extension of the extension portion.

According to one embodiment the external surface of the extension portion is configured to mechanically contact the inner surface of the sleeve portion in a plurality of locations to thereby form a multi-contact connection between the sleeve portion and the extension portion.

By providing a multi-contact connection, such as at least 10 contact points, for example at least 20 contact points, the inductance may further be reduced compared to a solution which only has a few contact points.

For example, the inner surface of the sleeve portion may have a plurality of circumferentially extending grooves, whereby ribs are formed between the grooves thus forming an undulating structure in the axial direction of the sleeve portion, the ribs being configured to be in mechanical contact with the external surface of the extension portion. Alternatively, the external surface of the extension portion may be provided with circumferentially extending grooves, whereby ribs are formed between the grooves, which ribs are configured to be in mechanical contact with the inner surface of the sleeve portion.

According to one embodiment the external surface is arranged at a distance from the inner surface of the sleeve portion along the entire axial extension of the extension portion.

According to one embodiment the pin is configured to be in mechanical contact with the cap portion.

According to one embodiment the mechanical contact between the pin and the cap portion is in the radial direction.

According to one embodiment the mechanical contact between the pin and the cap portion is in the axial direction.

According to one embodiment the cap portion has a pin opening configured to receive the pin, wherein the pin opening has an inner surface which in the axial direction is essentially parallel with the external surface of the pin when the pin is received by the cap portion.

According to one embodiment the lid comprises an insert assembly and the cap portion has an insert assembly opening configured to receive the insert assembly, wherein the insert assembly comprises a plunger having a plunger opening configured to receive the end portion of the pin, wherein the plunger is configured to mechanically contact the end portion of the pin, and wherein the insert assembly comprises a resilient member configured to bias the plunger axially in the insert assembly opening towards a bottom surface of the insert assembly opening to provide mechanical contact between the plunger and the cap portion.

This reduces the tolerance requirements for the pin and the insert assembly opening configured to receive the pin, while still reducing the inductance during very fast transients due to the proximity of the plunger and the inner surface of the plunger opening.

According to one embodiment the resilient member is arranged in the plunger opening, and configured to bear against an end face of the pin.

According to one embodiment an inner surface of the plunger opening is provided with at least one radially resilient contact element configured to provide mechanical contact between the plunger and the pin.

According to one embodiment the lid is provided with first threads and the inner surface of the sleeve portion is provided with second threads configured to cooperate with the first threads to thereby connect the lid with the sleeve portion.

There is according to a second aspect of the present disclosure provided an electromagnetic induction device comprising a bushing according to the first aspect.

The electromagnetic induction device may be a high voltage electromagnetic induction device.

The electromagnetic induction device may for example be a transformer, such as a power transformer, or a reactor.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
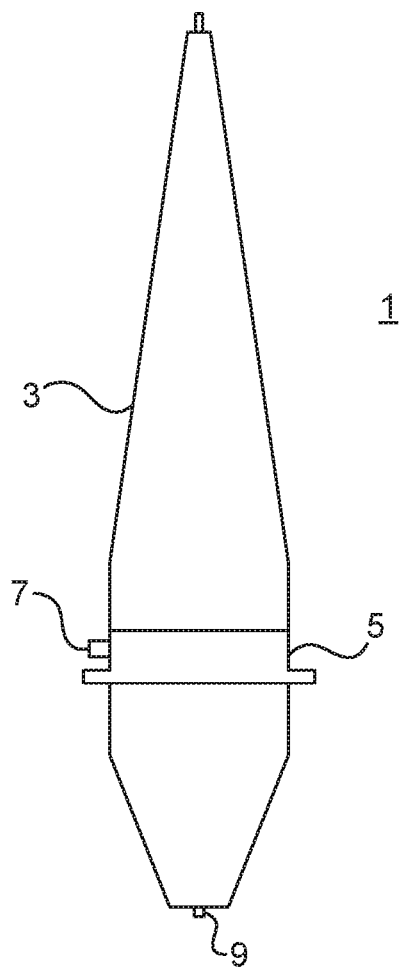
FIG. 1 schematically shows a side view of an example of a bushing.

FIG. 1 shows an example of a bushing 1. In particular, the exemplified bushing 3 is a condenser core type of bushing. The bushing 1 has a bushing body 3 and a flange body 5. The flange body 5 is provided around the bushing body 3. The flange body 5 is provided with a tap assembly 7.

The flange body 5 is configured to enable fixation/mounting of the bushing 1 to an object such as a wall.

The bushing 1 may also comprise a central conductor 9 extending longitudinally through the bushing body 3. The central conductor 9 may extend from one end of the bushing body 3 to the opposite end of the bushing body 3.

The bushing 1 may for example be a high voltage bushing or a medium voltage bushing. The bushing 1 may be a High Voltage Direct Current (HVDC) bushing.

Figure 2:
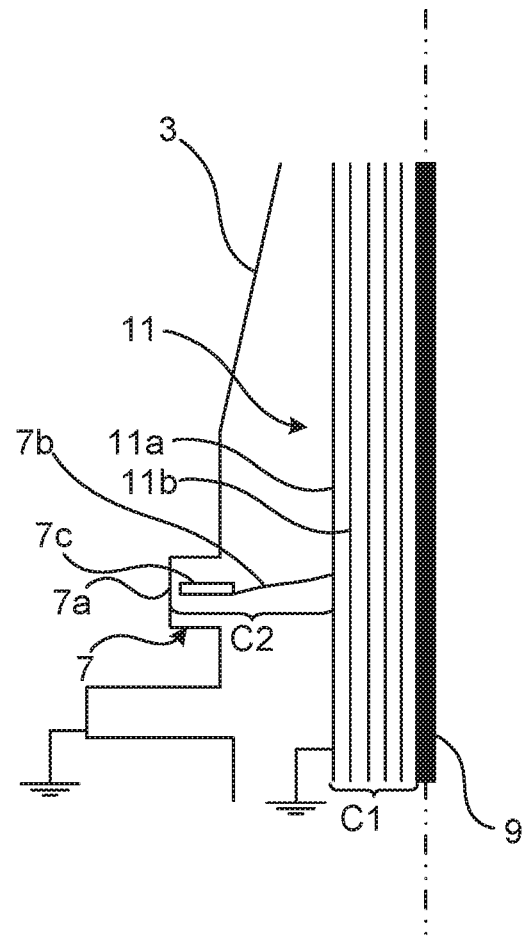
FIG. 2 shows a portion of the bushing in FIG. 1 in a longitudinal section.

With reference to FIG. 2, a portion of the bushing 1 in FIG. 1 is shown with certain components of its interior exposed. In particular, the bushing 1 comprises a condenser core 11 provided around the central conductor 9. The condenser core 11 is arranged inside the bushing body 3.

The condenser core 11 comprises a plurality of electrically conductive layers 11a, 11b provided concentrically around the central conductor 9. The electrically conductive layers 11a, 11b are electrically insulated from each other. The outermost electrically conductive layer 11a forms an electrode and is configured to be grounded. There is a capacitance C1 between the outermost electrically conductive layer 11a and the central conductor 9 which forms another electrode.

The tap assembly 7 has a lid 7a which is in electrical connection with the flange body 5. The flange body 5 is grounded when the bushing 1 has been installed. The lid 7a is hence also grounded in normal operation when the bushing 1 has been installed. There is a capacitance C2 between the outermost conductive layer 11a and the lid 7a/flange body 5. The flange body 5 may typically form its ground connection by means of a screw/bolt connection that attaches the bushing 1 to e.g. an electromagnetic induction device such as a transformer or reactor.

The tap assembly 7 has a conductor 7b connected to the outermost conductive layer 11a and a pin 7c connected to the conductor 7b. The lid 7a is removable, which when removed enables measurements of a current flowing through the conductor 7b and the pin 7c.

It is to be noted that the bushing does not have to be a condenser core bushing. The bushing could alternatively be a gas insulated bushing containing an electrode in the form of a screen around the central conductor. The capacitance C1 is in this case formed between the screen and the central conductor. The screen is normally grounded to the flange body when the lid is assembled with the remainder of the tap assembly. When the lid is removed, the screen becomes insulated from the flange body enabling measurements.

Figure 3A:
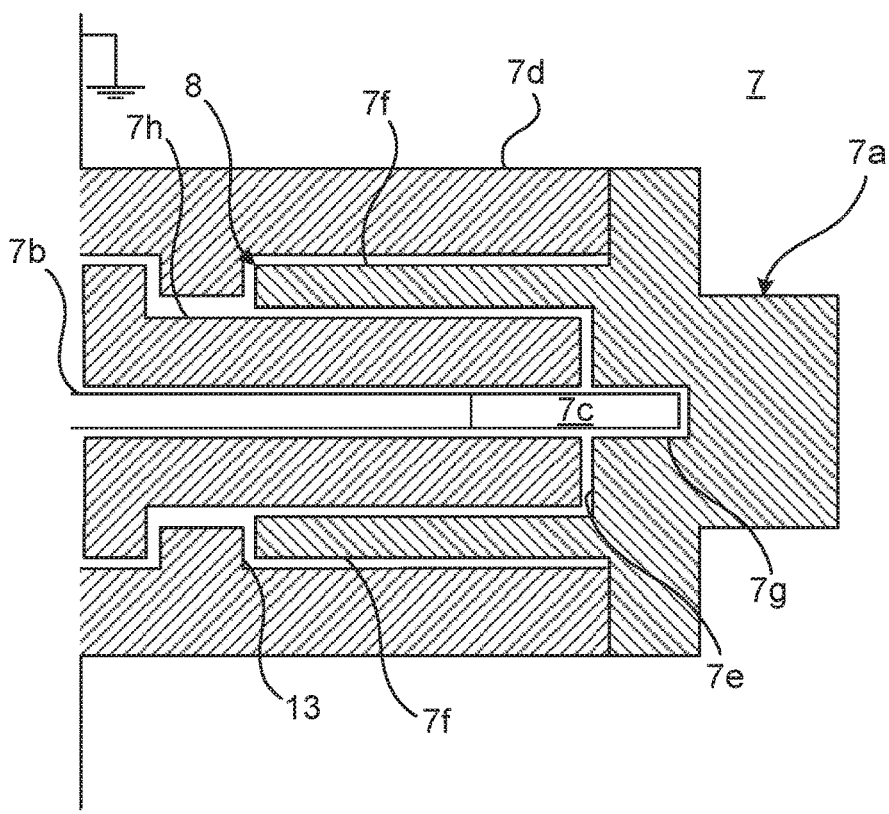
FIG. 3a schematically depicts a section of an example of a tap assembly.

FIG. 3a shows an example of a tap assembly. Tap assembly 7 has a hollow electrically conductive sleeve portion 7d extending from the flange body 5. The sleeve portion 7d may for example be annular. The tap assembly 7 furthermore comprises the conductor 7b and the pin 7c. The conductor 7b is connected to the outermost conductive layer 11a of the condenser core 11 shown in FIG. 2. The pin 7c is attached to an end of the conductor 7b.

The tap assembly 7 also includes the lid 7a. The lid 7a is configured to be attached to the sleeve portion 7d, as shown in FIG. 3a. The lid 7a is electrically conductive.

The lid 7a comprises a cap portion 7e and an extension portion 7f, or protrusion, extending from the cap portion 7e. The sleeve portion 7d is configured to receive the extension portion 7f. When the lid 7a is mounted to the sleeve portion 7d, the extension portion 7f extends into the hollow sleeve portion 7d.

The extension portion 7f is hollow. The extension portion 7f may preferably be circumferentially closed. The extension portion 7f is preferably rotationally symmetrically with respect to the central axis of the lid 7a.

The extension portion 7f has a similar cross sectional shape as the cross-sectional shape of the sleeve portion 7d. Thus, in the present example where the sleeve portion 7d forms a cylindrical inner space, the extension portion 7f is also cylindrical. The extension portion 7f may be designed so that the external surface thereof follows the inner surface of the sleeve portion 7d.

The cap portion 7e has a pin opening 7g configured to receive the pin 7c. The pin opening 7g is thus provided at an inner face of the cap portion 7e. The pin opening 7g may be arranged centred in the cap portion 7e. The pin 7c or the end portion of the pin 7c is in mechanical contact with the cap portion 7e. The pin opening 7g may be configured to receive the pin 7c with a tight fit. The pin 7c is in contact with the inner surface of the pin opening 7g. This contact may be radial and/or axial. There may be means such as a resilient member provided between the inner surface of the pin opening 7g and the pin 7c for providing this contact, or the pin 7c may be in direct contact with the inner surface of the pin opening 7g. Alternatively, or additionally, the pin 7c may be resilient in the axial direction. The resilient member may for example provide multiple mechanical contacts between the pin and the pin and the inner surface of the pin opening.

The tap assembly 7 comprises an insulating body 7h. The insulating body 7h is provided around the conductor 7b in the sleeve portion 7d. The insulating body 7h provides electrical insulation around the conductor 7b. There is a distance or clearance between the external surface of the insulating body 7h and the inner surface of the sleeve portion 7d in the radial direction. The space formed between these two components along the length of the sleeve portion 7d defines a chamber 8. According to the example, the chamber 8 is delimited in the axial direction by an inner flange 13.

The extension portion 7f preferably extends into the sleeve portion 7d along the entire length or substantially the entire length of the chamber 8. The space is hence filled with the extension portion 7f in the axial direction. The space is preferably also filled in the radial direction by the extension portion 7f.

The lid 7a may be connected mechanically to the sleeve portion 7d. The mechanical contact may for example be by means of a threaded structure. The extension portion 7f may for example have first treads provided on the external surface thereof and the sleeve portion 7d may have second threads provided on the inner surface thereof. The first threads and the second threads may be configured to cooperate with each other. Since the lid 7a is in mechanical contact with the sleeve portion 7d, the lid 7a is also grounded when the bushing 1 has been installed and the lid 7a is mounted to the sleeve portion 7d. The extension portion 7f has the same electric potential as the rest of the lid 7a, and thus the extension portion 7f is also grounded. Ground is hence placed closer to the conductor 7b by means of the extension portion 7f.

Figure 3B:
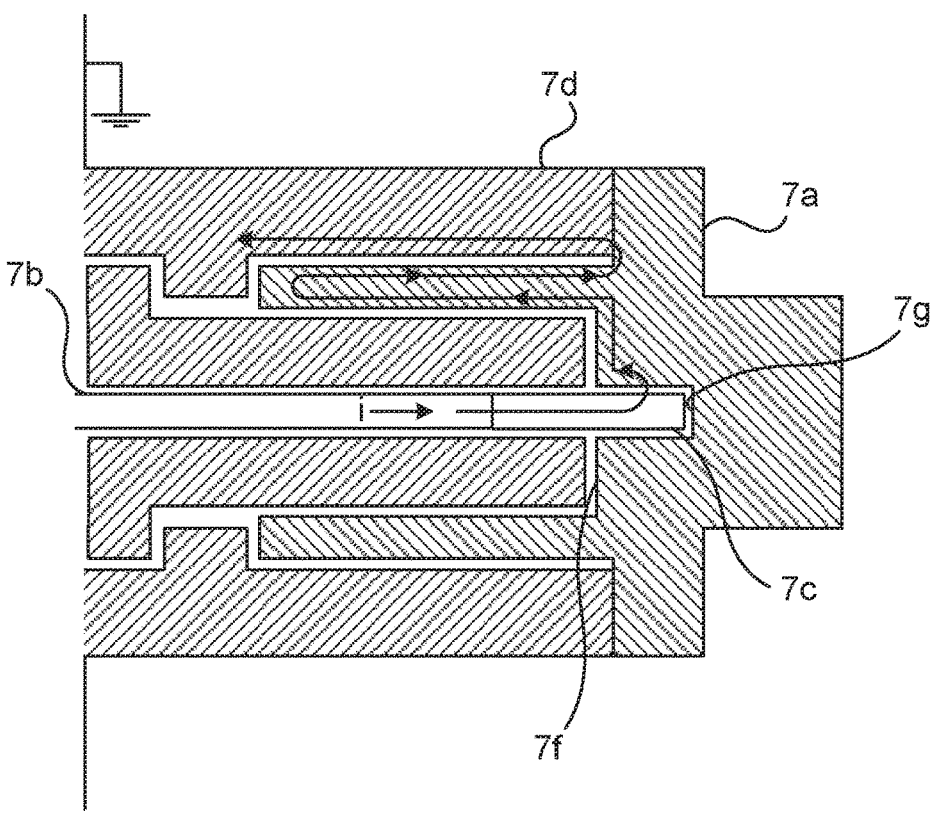
FIG. 3b shows current flowing through the tap assembly in FIG. 3a during a very high transient.

FIG. 3b shows how the tap assembly 7 handles capacitive currents during very fast transients. In this example, the external surface of the extension portion 7f is arranged at a distance from the sleeve portion 7d and the inner flange 13. The current i flows from the condenser core 11, in particular via the outermost conductive layer 11a, through the conductor 7b and into the pin 7c. The flange body 5 and the sleeve portion 7d extending from the flange body 5 are both grounded, as is the lid 7a.

The current i flows through the pin 7c and into the cap portion 7e. The current i continues to flow in the backwards direction, i.e. opposite to the direction of the current flow in the conductor 7b along the inner surface of the pin opening 7g. The current i will subsequently move radially outwards to the extension portion 7f where it will follow the insulating body 7h in a direction away from the lid 7a along the inner surface of the extension portion 7f along the length of the extension portion 7f. The current i will then flow along the outer surface of the extension portion 7f towards the lid 7a, into the led and finally along the inner surface of the sleeve portion 7d towards the flange body 5 and ground.

Figure 4A:
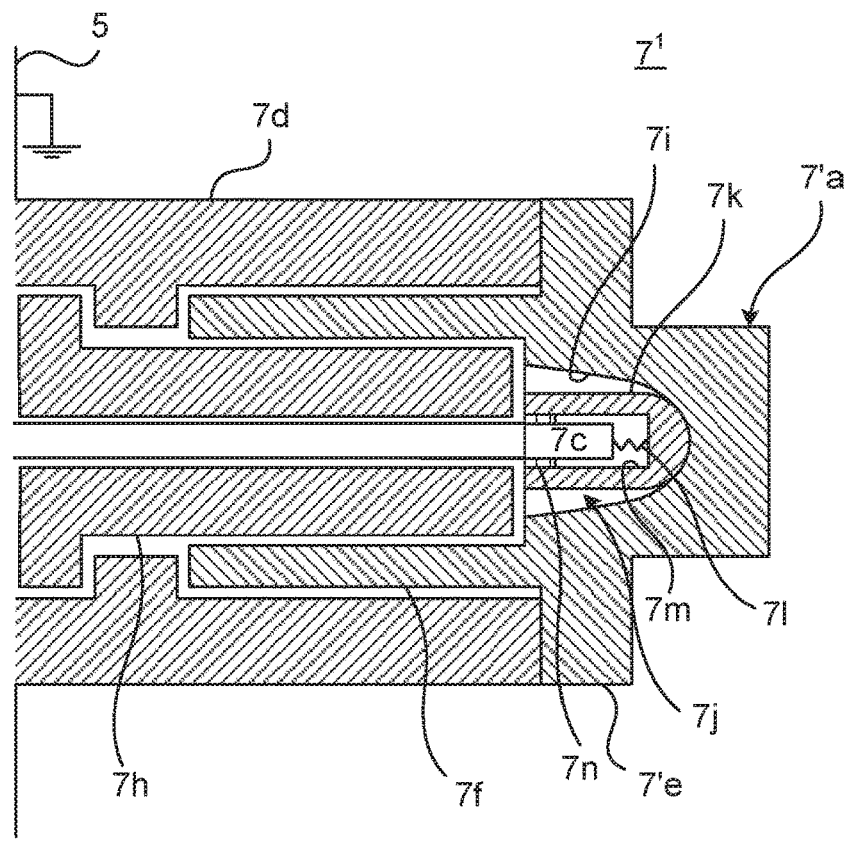
FIG. 4a schematically shows a section of another example of a tap assembly.

FIG. 4a depicts another example of a tap assembly. Tap assembly 7' is similar to the tap assembly 7. The lid 7'a however has a different structure. The lid 7'a includes a cap portion 7'e and an extension portion 7f. Extension portion 7f is identical to the extension portion 7f of the lid 7a. The differences will be explained in more detail in the following.

The lid 7'a has an insert assembly opening 7i. In particular, the cap portion 7'e is provided with the insert assembly opening 7i. The lid 7'a furthermore includes an insert assembly 7j. The insert assembly 7j includes a plunger 7k, and a resilient member 7l. The insert assembly opening 7i is configured to receive the insert assembly 7*j*. The plunger 7*k* is provided with a plunger opening 7*m* configured to receive the pin 7*c*. The plunger opening 7*m* is furthermore configured to receive the resilient member 7*l*. The resilient member 7*l* is arranged between the end face of the pin 7*c* and the bottom of the plunger opening 7*m*. When the pin 7*c* is arranged inside the plunger opening 7*m*, the pin 7*c* is pressed against the resilient member 7*l*. This causes the resilient member 7*l* to be compressed. The resilient member 7*l* thereby biases the plunger 7*k* axially towards the bottom surface of the insert assembly opening 7*i*, i.e. away from the end face of the pin 7*c*. The plunger 7*k* is thus set in mechanical contact with the cap portion 7'*e*.

The inner surface of the plunger opening 7*m* may be provided with one or more radially resilient contact elements 7*n* configured to provide mechanical contact between the plunger 7*k* and the pin 7*c*. The radially resilient contact element(s) may for example provide multiple mechanical contacts between the pin and the pin and the inner surface of the plunger opening.

In this manner, the pin 7*c* is set in mechanical and electrical contact with the cap portion 7'*e*. Due to the plunger 7*k* and the biasing thereof, the tolerances do not have to be as strict as in the example shown in FIGS. 3*a* and 3*b* for obtaining mechanical contact between the pin 7*c* and the lid 7'*a*.

As an alternative to a plunger, a spring washer could be used to provide the axial contact between pin 7*c* and the lid 7'*a*.

Figure 4B:
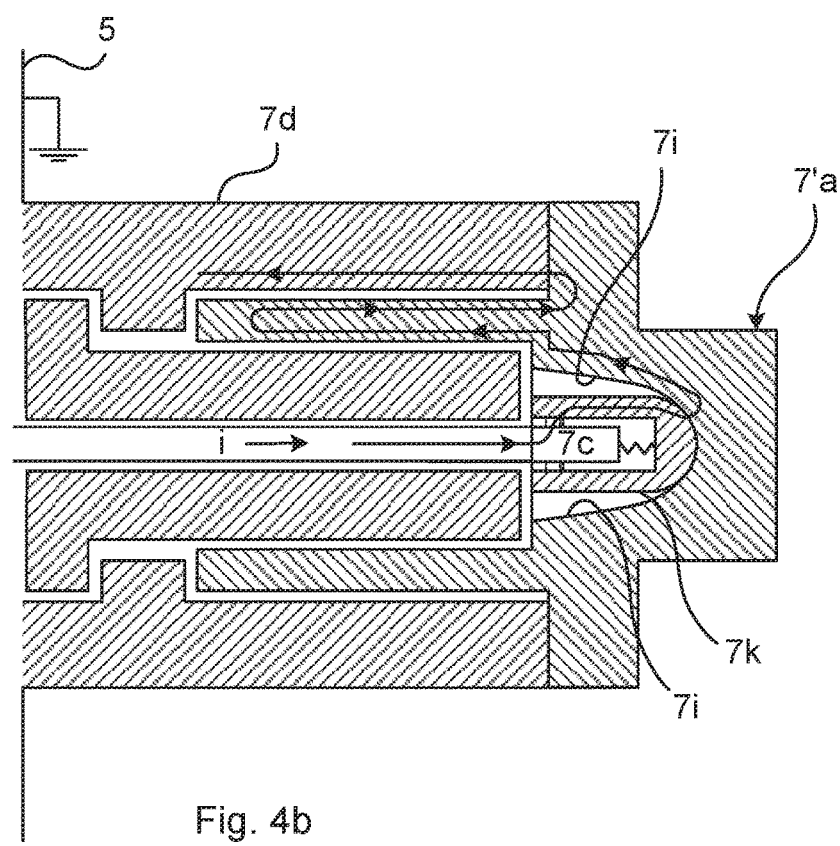
FIG. 4b shows current flowing through the tap assembly in FIG. 4a during a very high transient.

FIG. 4*b* shows how the tap assembly 7' handles capacitive currents during very fast transients. The current i flows from the condenser core 11, in particular via the outermost conductive layer 11*a*, through the conductor 7*b* and into the pin 7*c*. The flange body 5 and the sleeve portion 7*d* extending from the flange body 5 are both grounded.

The current i flows through the pin 7*c* and into the plunger 7*k*. The current i then flows from the plunger 7*k* to the lid 7'*a* via the mechanical contact of the plunger 7*k* with the bottom surface of the insert assembly opening 7*i*. From here the current i will flow in a similar manner as shown in FIG. 3*b*.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:
1. A bushing comprising:
a bushing body,
an electrode contained in the bushing body,
a flange body mounted to the bushing body, wherein the flange body is grounded during normal operation of the bushing,
a tap assembly comprising:
a hollow electrically conductive sleeve portion extending from the flange body,
a conductor connected to the electrode and extending from the electrode into the sleeve portion,
a pin connected to the conductor,
an insulating body provided around the conductor in the sleeve portion, and
an electrically conductive lid configured to be assembled with the sleeve portion,
the lid having a cap portion and a hollow cylindrical extension portion, wherein the pin is configured to be in mechanical contact with the cap portion,
wherein the cap portion is configured to receive an end portion of the pin,
wherein the extension portion extends axially from the cap portion and is configured to be received by the sleeve portion, and wherein the extension portion is configured to surround the insulating body in the sleeve portion when the lid is assembled with the sleeve portion,
wherein in the sleeve portion the insulating body is arranged at a radial distance from the inner surface of the sleeve portion, whereby a chamber is formed therebetween, wherein the extension portion is configured to extend inside the chamber from a lid end of the chamber and along at least half of the length of the chamber, or along at least two thirds of the length of the chamber, or along at least three fourths of the length of the chamber, and
wherein the extension portion has a free end arranged in the sleeve portion when the lid is assembled with the sleeve portion, and wherein the external surface of the extension portion is arranged at a distance from the inner surface of the sleeve portion along the entire axial extension of the sleeve portion.

2. The bushing as claimed claim 1, wherein the extension portion has an external surface which follows the profile of the inner surface of the sleeve portion in the axial direction, and wherein the extension portion has an inner surface which follows the profile of the external surface of the insulating body in the axial direction.

3. The bushing as claimed in claim 1, wherein the extension portion fills a majority of the chamber.

4. The bushing as claimed in claim 1, wherein the mechanical contact between the pin and the cap portion is in the radial direction.

5. The bushing as claimed in claim 1, wherein the mechanical contact between the pin and the cap portion is in the axial direction.

6. The bushing as claimed in claim 1, wherein the cap portion has a pin opening configured to receive the pin, wherein the pin opening has an inner surface which in the axial direction is essentially parallel with the external surface of the pin when the pin is received by the cap portion.

7. The bushing as claimed in claim 1, wherein the lid comprises an insert assembly and the cap portion has an insert assembly opening configured to receive the insert assembly, wherein the insert assembly comprises a plunger having a plunger opening configured to receive the end portion of the pin, wherein the plunger is configured to mechanically contact the end portion of the pin, and wherein the insert assembly comprises a resilient member configured to bias the plunger axially in the insert assembly opening towards a bottom surface of the insert assembly opening to provide mechanical contact between the plunger and the cap portion.

8. The bushing as claimed in claim 7, wherein the resilient member is arranged in the plunger opening, and configured to bear against an end face of the pin.

9. The bushing as claimed in claim 7, wherein an inner surface of the plunger opening is provided with at least one radially resilient contact element configured to provide mechanical contact between the plunger and the pin.

10. The bushing as claimed in claim 1, wherein the lid is provided with first threads and the inner surface of the sleeve portion is provided with second threads configured to cooperate with the first threads to thereby connect the lid with the sleeve portion.

* * * * *